Figure 2:
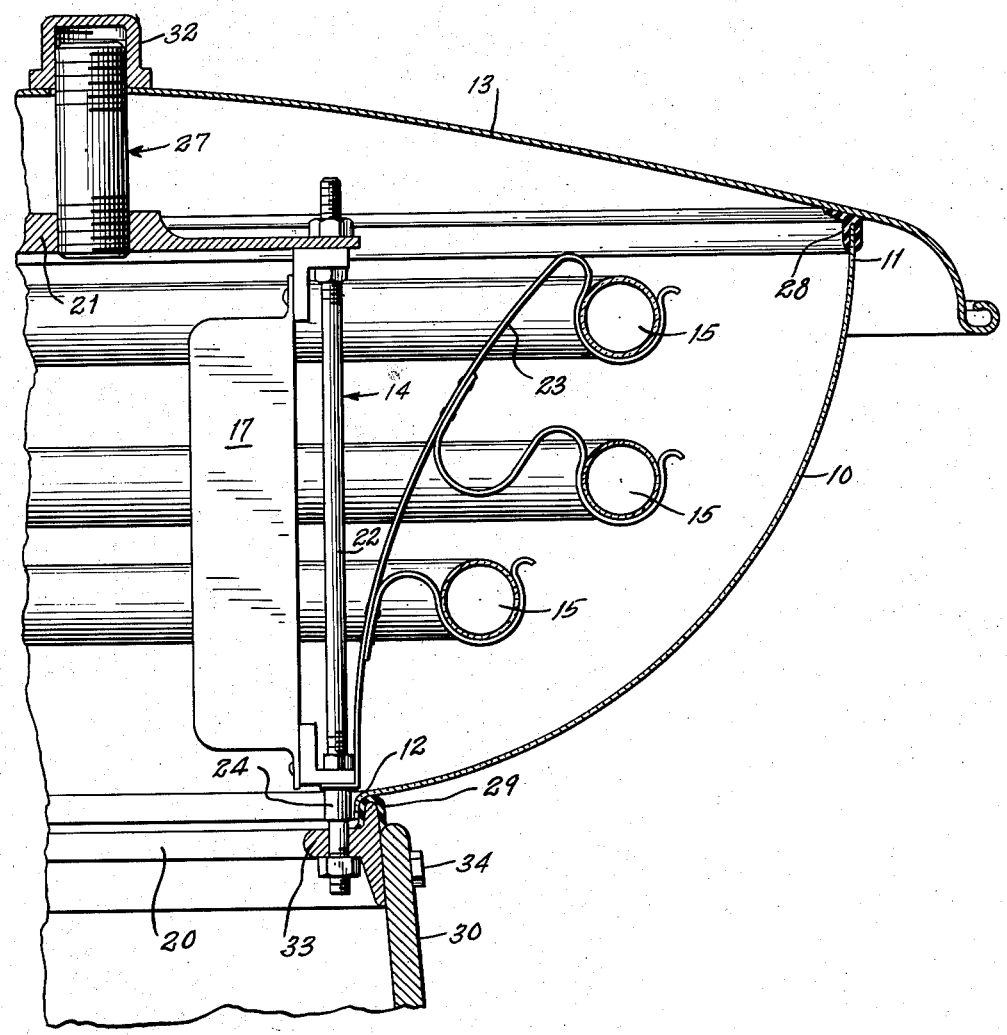

Dec. 6, 1960      H. C. PFAFF, JR      2,963,574
OUTDOOR LIGHTING FIXTURE
Filed Nov. 13, 1958      3 Sheets-Sheet 1
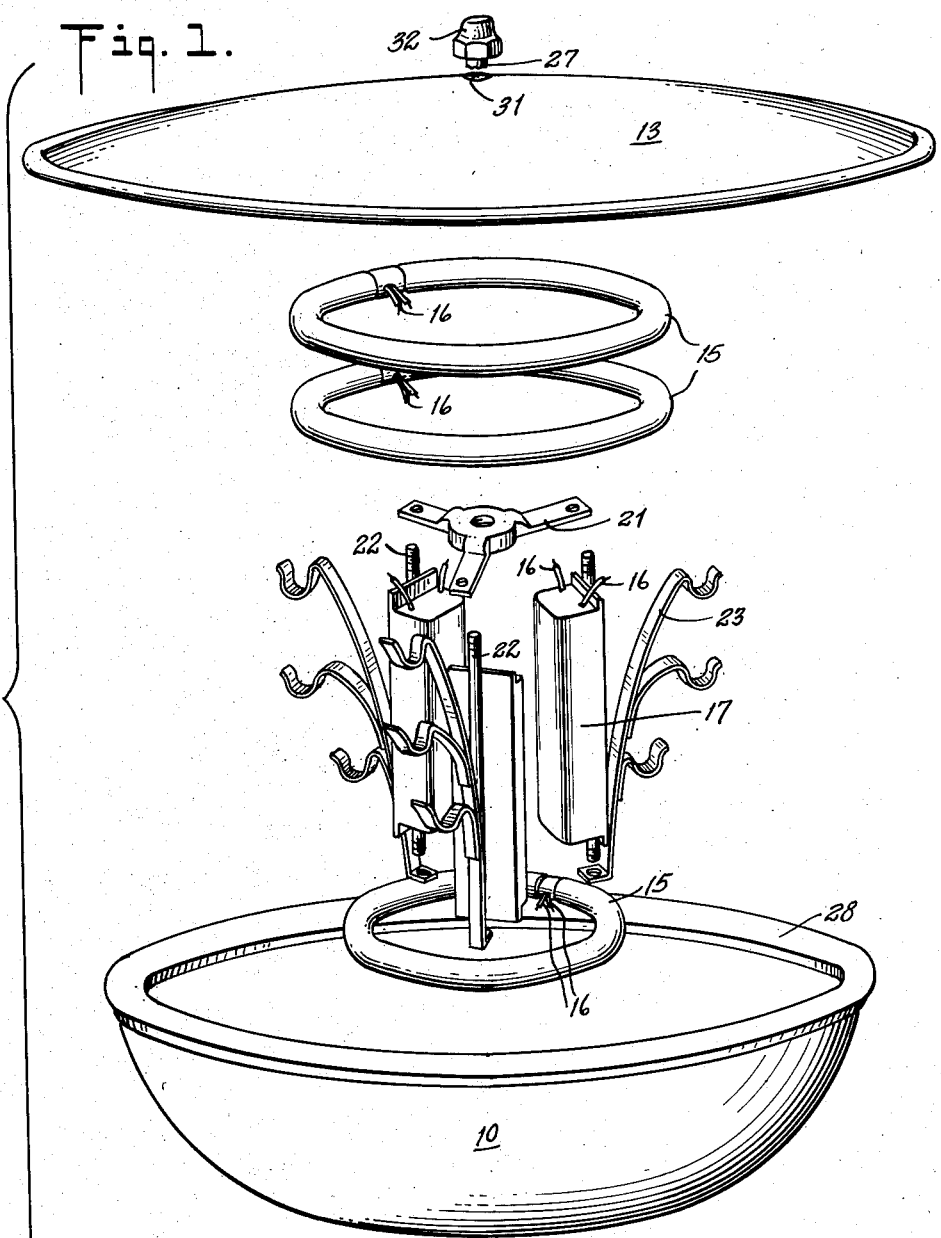
Fig. 1.
INVENTOR.
H. C. PFAFF, Jr.
BY
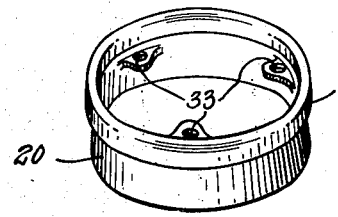
ATTORNEY Dec. 6, 1960 H. C. PFAFF, JR 2,963,574
OUTDOOR LIGHTING FIXTURE
Filed Nov. 13, 1958 3 Sheets-Sheet 2

INVENTOR.
H. C. PFAFF, Jr.
BY
ATTORNEY

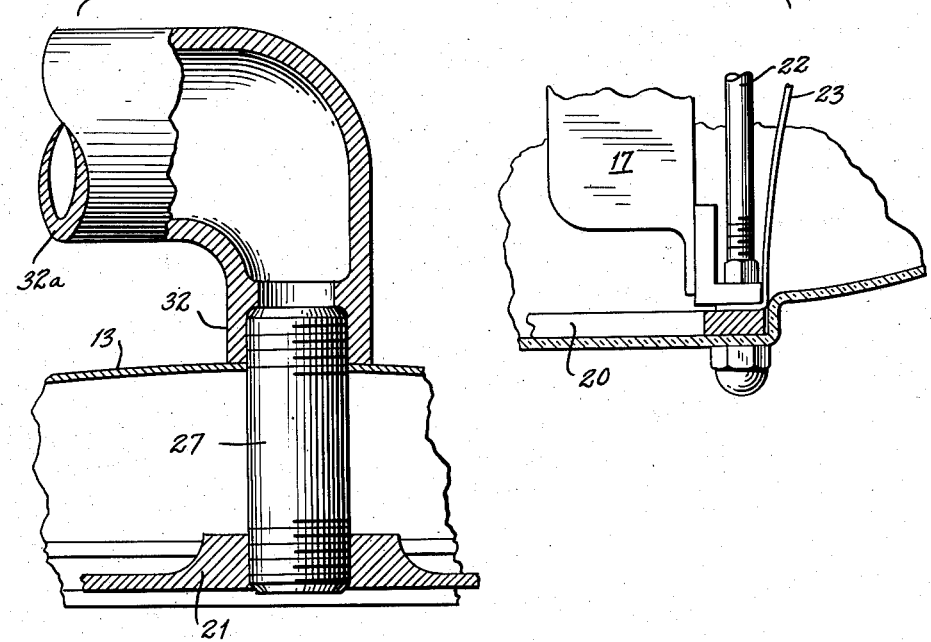
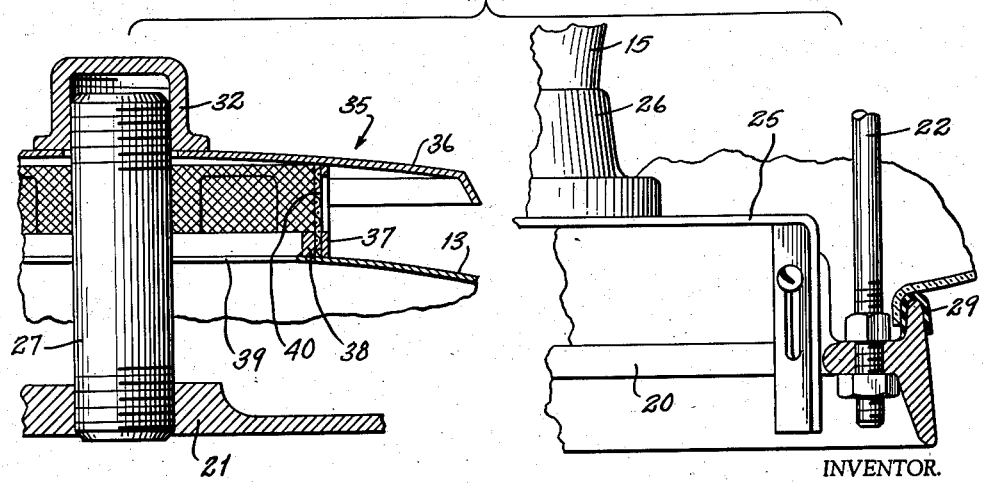

United States Patent Office 2,963,574
Patented Dec. 6, 1960

2,963,574

OUTDOOR LIGHTING FIXTURE

Henry C. Pfaff, Jr., Summit, N.J., assignor to Pfaff and Kendall, Newark, N.J., a corporation of New Jersey Filed Nov. 13, 1958, Ser. No. 773,632

1 Claim. (Cl. 240—51.12)

This invention relates to a lighting fixture adaptable for universal use for outdoor lighting purposes, having a novel frame for supporting various types of lighting units, and having structural features herein set forth, enabling it to be mounted upon a shaft at the bottom or to be pendantly supported or suspended from the top. When assembled, the fixture of the invention is completely sealed; it may be readily disassembled for inspection or replacement of parts from time to time.

The fixture of this invention is well adapted for outdoor lighting of building grounds, for walkways, for highways and landscapes and for complementing architectural driveways and building entrances.

Examples of practical devices embodying the invention are described below and in the accompanying drawings; the invention is not limited thereto, but covers all other forms coming within the scope or purview of the disclosure herein.

In the drawings:

Fig. 1 is an exploded, perspective view of a lighting fixture embodying the invention, Fig. 2 is an enlarged, vertical, fragmentary sectional view thereof, showing the fixture secured in sealed relation to the top of a shaft, Fig. 3 is a fragmentary, enlarged, vertical sectional view of the top and bottom portions of the fixture in a further form thereof, and Fig. 4 is a fragmentary view of top and bottom portions of a still further form of the fixture.

As shown in the drawings, wherein similar reference numbers indicate like parts throughout the several views, the fixture of this invention comprises a light permeable globe shell 10 open at the top thereof 11 (Fig. 2) and of lesser diameter at the bottom 12 thereof and a hood 13 proportioned to close the open top 11 of the globe shell 10 when positioned thereagainst. A support frame 14 is provided for lighting units interiorly of said globe; these may be in the form of the circular fluorescent units 15 of Figs. 1 and 2, for example, increasing in diameter as they progress upwardly so as to follow the contour of the globe and not interfere with each other in directing light therethrough diagonally downward and outward, or a mercury vapor or incandescent lamps in the Fig. 4 form, suitably wired to a source of power as, for example, indicated by the reference characters 16 (Fig. 1), with suitable ballast apparatus 17 secured to the frame 14 interiorly of the fixture or disposed exteriorly thereof and connected to a suitable power source (not shown).

The frame 14 comprises a ring 20 (Figs. 2, 3 and 4) positioned on the lower end of the globe, studs 22 engaging a spider 21 and the ring 20 and disposing the spider at the upper end of the globe shell (Fig. 2) and the ring in engagement with the lower end of the globe shell. A lamp support bracket 23 is provided which may as shown in Fig. 1, have elongated, inclined arms with branches presenting upwardly opening notches for frictionally receiving and supporting the fluorescent lamps 15 (Fig. 2) and is secured to stud-bolts 22 or rods threaded at both ends, with suitable spacers 24, encircled by said lamps. As shown in Fig. 4 the lamp support bracket may be in the form of a strap 25 to which a socket assembly 26 is secured for holding the light units 15. Means 27 (Fig. 2) are provided engaging the spider and hood, for clamping the hood onto the top of the shell 10 to close the same. A gasket 28 of neoprene or other suitable material may be positioned on the upper end of the globe shell and compressed between said upper edge and the hood, when the hood is so clamped to the top of the shell; a gasket 29 (Fig. 2) may be positioned on the ring 20 and compressed between it and the lower end of the globe shell 10 when the latter is so engaged by the ring, thereby essentially sealing the assembly, which may be secured (as in Fig. 2) to the top of a shaft 30 as at 34 to define a pedestal mounted lighting unit. The hood 13 is preferably provided with an aperture 31 through which the said means 27 pass, and a cap 32 of larger diameter than the aperture may be positioned thereover in engagement with means 27 to thereby so engage the hood and clamp it to the spider 21.

The studs 22 may be connected to the ring 20 by engaging the internally threaded bosses 33 provided on said ring 20 (Fig. 2). The cap 32 may be in the form shown in Fig. 3 of a pendant elbow 32a threadedly engaging the member 27 and the hood 13 at one end and secured to a pendant support such as the upper end of a davit, for example, or a fixture extended from a building or other unit support for the lighting device of the invention. The lower portion of the globe shell and its connected ring 20 may be appropriately modified, compared with the first embodiment, as here illustrated.

In the Fig. 4 form, the device is shown vented where, for example, the lighting units generate a good deal of heat or where, for other reasons, it is desirable to ventilate the same. In such case, a ventilator assembly may be provided, comprising a shell 36 positioned beneath the cap 32 and over an apertured ring 37; a narrow centering ring 38 is in such case secured to the top of the hood 13 which in this case, is provided with a large medial aperture 39 and a Fiberglas or other screen 40 interposed between the rings 38 and 37.

Having thus described my invention, what I claim as new and desire to secure by Letters Patent is:

A lighting fixture adapted to be secured to an outdoor support comprising a light-permeable cup-shaped globe open at the top and bottom, said bottom opening being substantially smaller than the top opening, a hood for said globe with its lower surface substantially in engagement with the globe top to close the same and proportioned to extend substantially beyond the said open top, a support frame for circular lamps interiorly of the globe comprising a ring engaging the lower end of the globe in encircling abutment therewith, a plurality of stud-bolts positioned within the globe for encirclement by said lamps and extending from the ring to the globe top, inclined arms each with a lower end connected to a stud-bolt and branches disposed one above another and presenting upwardly opening notches for frictionally receiving said lamps, the upper notches being spaced more widely than the lower ones, means engaging the stud-bolts and ring for securing them together, a spider proportioned to bridge the stud-bolts near the upper ends thereof, means engaging the stud-bolts and spider to interconnect the latter and the upper ends of the stud-bolts, and means interconnecting the hood and spider, holding the hood on the globe.

References Cited in the file of this patent

UNITED STATES PATENTS

| | | |
|---|---|---|
| 1,357,559 | Heilenday | Nov. 2, 1920 |
| 1,545,711 | Townsend | July 14, 1925 |
| 2,814,721 | Fry | Nov. 26, 1957 |